(12) United States Patent
Lee et al.

(10) Patent No.: US 8,199,276 B2
(45) Date of Patent: Jun. 12, 2012

(54) LIQUID CRYSTAL DISPLAY AND METHOD THEREOF

(75) Inventors: Chul-Woo Lee, Asan-si (KR); Jin-Ho Cho, Cheonan-si (KR); Jae-Woo Jang, Suwon-si (KR); Young-Jae Lee, Yongin-si (KR); Neung-Beom Lee, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 649 days.

(21) Appl. No.: 12/351,956

(22) Filed: Jan. 12, 2009

(65) Prior Publication Data
US 2009/0180050 A1    Jul. 16, 2009

(30) Foreign Application Priority Data
Jan. 16, 2008   (KR) .................. 10-2008-0005069

(51) Int. Cl.
*G02F 1/13357*    (2006.01)
(52) U.S. Cl. ............. 349/58; 349/68; 349/161; 349/187
(58) Field of Classification Search .................. 349/58, 349/61, 68, 149, 162, 161, 187; 345/102; 362/631, 633, 97.2; 445/24
See application file for complete search history.

(56) References Cited

U.S. PATENT DOCUMENTS

| | | | |
|---|---|---|---|
| 2006/0170368 A1* | 8/2006 | Jang | 315/118 |
| 2006/0214905 A1* | 9/2006 | Okazaki | 345/102 |
| 2007/0290985 A1* | 12/2007 | Matsumoto et al. | 345/102 |
| 2008/0084520 A1* | 4/2008 | Nam et al. | 349/65 |
| 2008/0198297 A1* | 8/2008 | Choi et al. | 349/65 |

FOREIGN PATENT DOCUMENTS

| | | |
|---|---|---|
| JP | 2000171773 | 6/2000 |
| JP | 2007122954 | 5/2007 |
| KR | 1020050060229 | 6/2005 |

* cited by examiner

*Primary Examiner* — Dung Nguyen
*Assistant Examiner* — Tai Duong
(74) *Attorney, Agent, or Firm* — Cantor Colburn LLP

(57) ABSTRACT

A liquid crystal display includes a liquid crystal panel displaying images, a light source supplying light to the liquid crystal panel, a circuit board including at least one of a brightness sensor and a temperature sensor, a frame including a plurality of sidewalls each including an inner surface, an outer surface and a top surface, the frame including a recess into which the circuit board is inserted downwardly, and the top surface including an open area through which the recess is accessible, and a blocking member covering the open area of the top surface where the frame recess is opened.

12 Claims, 11 Drawing Sheets

LIQUID CRYSTAL DISPLAY AND METHOD THEREOF

This application claims priority to Korean Patent Application No. 10-2008-0005069 filed on Jan. 16, 2008 in the Korean Intellectual Property Office, and all the benefits accruing therefrom under 35 U.S.C. §119, the disclosure of which is incorporated herein by reference in its entirety.

BACKGROUND OF THE INVENTION

1. Field of the Invention

The present invention relates to a liquid crystal display, and more particularly, to a liquid crystal display which can reduce power consumption and prevent a reduction in the service life thereof.

2. Description of the Related Art

In general, a liquid crystal display includes a liquid crystal display panel and a backlight unit.

The liquid crystal panel includes a first substrate provided with field-generating electrodes such as pixel electrodes and common electrodes, a second substrate facing the first substrate, and a liquid crystal layer having liquid crystal molecules and formed between the first and second substrates. Voltages are applied to field-generating electrodes to generate an electric field in the liquid crystal layer having liquid crystal molecules, which determines the orientations of the liquid crystal molecules to control polarization of incident light, thereby displaying images. The liquid crystal panel of a liquid crystal display does not emit light by itself. The liquid crystal display requires the use of a separate backlight unit as a light source to supply light to the liquid crystal panel.

Backlight unit is roughly classified into an edge type backlight unit in which light is supplied from an edge area of a liquid crystal display, and a direct type backlight unit in which light is directly supplied from a rear surface of a liquid crystal display.

The edge type backlight unit includes a light source supplying light to the liquid crystal panel, a light guide plate guiding the light emitted from the light source to the liquid crystal panel, and optical sheets provided for improving optical properties of the light guided to the liquid crystal panel. The direct type backlight unit includes a diffusion plate provided for reducing bright rays of the light emitted from the light source, and optical sheets provided for improving optical properties of the light having passed through the diffusion plate. The light guide plate, diffusion plate and/or optical sheets may be received in a frame to then be aligned in the backlight unit.

In such a liquid crystal display, the light source can be driven by supplying a voltage from an inverter.

BRIEF SUMMARY OF THE INVENTION

Since an inverter may be used to provide power to the separate light source required by the liquid crystal display, there are disadvantages in employing the inverter. For example, the inverter consumes a considerable portion of power consumed by the liquid crystal display. In addition, the inverter is a primary cause of raising the temperature of the liquid crystal display, which may result in a shortened service life of the liquid crystal display. Accordingly, it is desirable to reduce power consumption of a liquid crystal display while preventing a reduction in the service life of the liquid crystal display, such as by adjusting power consumption of the inverter depending on the brightness of a liquid crystal panel, based on the light supplied from a light source and/or the temperature of the backlight unit. An exemplary embodiment provides a liquid crystal display which can reduce power consumption and prevent a reduction in the service life thereof.

In an exemplary embodiment, there is provided a liquid crystal display including a liquid crystal panel displaying images, a light source supplying light to the liquid crystal panel, a circuit board including at least one of a brightness sensor and a temperature sensor, a frame including a plurality of sidewalls each including an inner surface, an outer surface and a top surface, the frame including a recess into which the circuit board is inserted in an insertion direction taken from the liquid crystal panel towards a rear of the liquid crystal display, the top surface including an open area through which the recess is accessible from an outside of the frame, and a blocking member covering the open area of the top surface such that movement of an inserted circuit board to the outside of the frame in a direction opposite to the insertion direction is restricted.

In an exemplary embodiment, there is provided a liquid crystal display including a liquid crystal panel displaying images, a light source supplying light to the liquid crystal panel, a circuit board including at least one of a brightness sensor and a temperature sensor, and a frame including a plurality of sidewalls each including an inner surface, an outer surface and a top surface, the frame including a recess into which the circuit board is inserted in an insertion direction taken from the inner surface towards the outer surface, and the inner surface including an open area through which the recess is accessible from an inside of frame.

An exemplary embodiment of a method of manufacturing a liquid crystal display provides disposing an inner surface of a sidewall of a frame to face a light source emitting light, removably inserting a circuit board into the sidewall of the frame, the inserting a circuit board including exposing a first surface of the circuit board to emitted light from the light source, and the circuit board including at least one of a brightness sensor and a temperature sensor disposed on the first surface; and interfacing the circuit board to a power source. The power source supplies voltage to the light source and adjusts the voltage supplied in response to inputs from one of the brightness sensor and the temperature sensor.

An exemplary embodiment of a method of driving a liquid crystal display provides detecting one of a brightness value and a temperature value occurring at an inside of a backlight assembly of the liquid crystal display, and adjusting a voltage supplied to a light source disposed at the inside of the backlight assembly in response to one of the brightness value and temperature value detected at the inside of the backlight assembly. The detecting includes a circuit board sensing the brightness value with a brightness sensor, and sensing the temperature value with a temperature sensor, the circuit board disposed in a member of the backlight assembly surrounding the inside of the backlight assembly, the brightness sensor and the temperature sensor being exposed to the inside of the backlight assembly. The adjusting includes a power source interfacing with the circuit board and adjusting the voltage supplied to the light source based on the detected values.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In the drawings, the size and relative sizes of layers and regions may be exaggerated for clarity. It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "below", "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, a liquid crystal display of the present invention will be explained in more detail with reference to the accompanying drawings.

Figure 1:
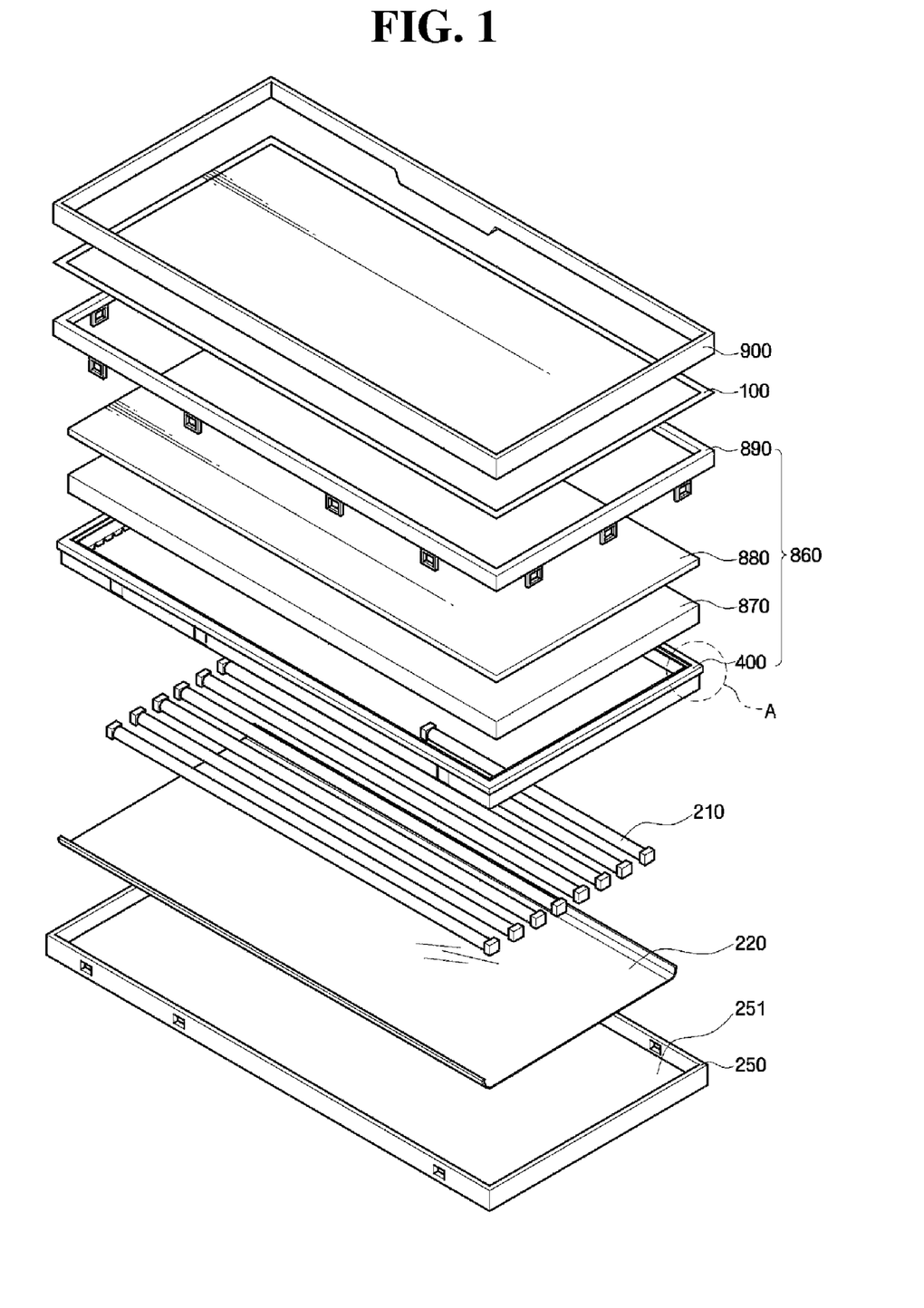
FIG. 1 is an exploded perspective view schematically illustrating an exemplary embodiment of a liquid crystal display according to the invention.
Figure 2:
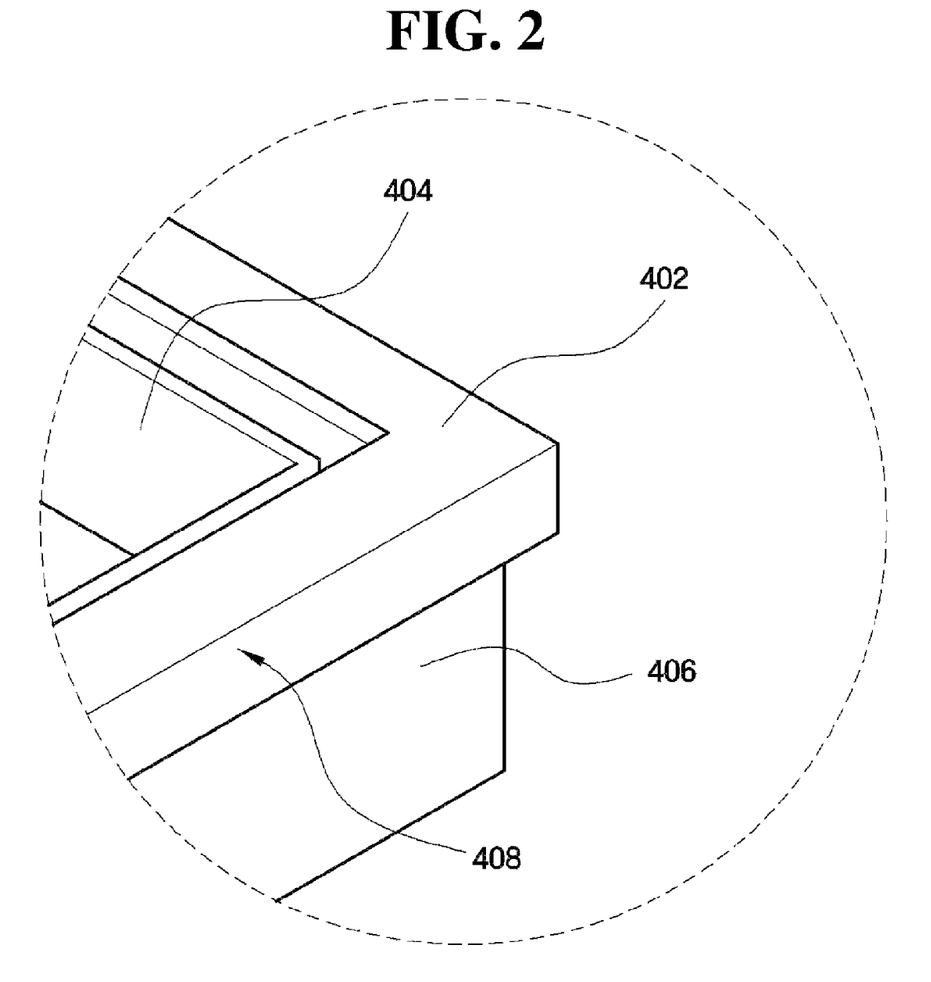
FIG. 2 is a plan view of a portion A shown in FIG. 1.

FIG. 1 is an exploded perspective view schematically illustrating an exemplary embodiment of a liquid crystal display according to the invention, and FIG. 2 is a plan view of portion A shown in FIG. 1. Although FIG. 1 shows a liquid crystal display including a direct type backlight unit, it is understood that the invention can also be applied to a liquid crystal display including an edge type backlight unit.

Referring to FIGS. 1 and 2, the liquid crystal display according to the illustrated embodiment of the present invention includes a liquid crystal panel 100 displaying images, a light source 210 supplying light to the liquid crystal panel 100, a frame 860 into which a circuit board (see 430 of FIG. 3 or 530 of FIG. 8) including at least one of a brightness sensor and a temperature sensor is inserted, an optical plate 870 interposed between the light source 210 and the frame 860, an optical sheet 880, and a reflective sheet 220 disposed below the light source 210, or opposing the LCD panel 100 relative to the light source 210. Here, the light source 210, the frame 860, the optical plate 870, the optical sheet 880, and the reflective sheet 220 constitute a backlight unit.

The liquid crystal panel 100 includes a first substrate (not shown), a second substrate (not shown) facing the first substrate, and a liquid crystal molecule layer (not shown) interposed between the first substrate and the second substrate.

The first substrate may be a thin film transistor ("TFT") substrate including TFTs (not shown), i.e., switching elements, arranged in a matrix. A data line and a gate line are connected to the source and gate terminals, and a pixel electrode is connected to the drain terminal in each TFT. The second substrate is a color filter substrate including red, green and blue ("RGB") pixels for color display arranged in a thin film type. A common electrode (not shown) made of a transparent conductive material is disposed on the second substrate. The liquid crystal molecule layer is interposed between the first substrate and the second substrate, and the arrangement of liquid crystal molecules varies according to an electric field created between the first substrate and the second substrate.

The light source 210 is responsive to an externally applied driving power and generates light.

Examples of the light source 210 include a cold cathode fluorescent lamp ("CCFL") having a long cylindrical shape, an external electrode fluorescent lamp ("EEFL") including external electrodes disposed at opposite ends thereof, or various other types of light emitting devices suitable for the purpose described herein. In a case of a direct type backlight unit such as shown in FIG. 1, the light source 210 is disposed below the liquid crystal panel 100. While FIG. 1 shows a line light source by way of example, a surface light source, or a spot light source such as a light emitting diode ("LED") may also be used within the scope of the present invention.

The light source 210 can be driven by supplying a voltage from an inverter (not shown) interfaced with the backlight unit of the display device. Here, the voltage supplied from the inverter can be adjusted depending on at least one of values measured by the brightness sensor and the temperature sensor of the circuit board. Accordingly, the power consumption of the inverter can be adjusted, and the overall power consumption of the liquid crystal display can be reduced, thereby reducing or effectively preventing a reduction in the service life of the liquid crystal display.

The frame 860 is disposed between the liquid crystal panel 100 and the light source 210. The frame 860 has a plurality of sidewalls 408, each including an inner surface 404, an outer surface 406, and a top surface 402. The frame 860 includes a housing recess (see 410 of FIG. 3 or 510 of FIG. 10), into which the circuit board is inserted. Meanwhile, the frame 860 may include a lower frame 400 and an upper frame 890. The housing recess 410, the lower frame 400, and the upper frame 890 will later be described in detail.

In an exemplary embodiment, such as the case of a direct type backlight unit shown in FIG. 1, the optical plate 870 may be in the form of a diffusion plate, but is not limited thereto. The diffusion plate diffuses the light directly incident from the light source 210 and the light incident after being reflected through the reflective sheet 220, thereby improving the uniformity brightness. In exemplary embodiments the diffusion plate may be made of a transparent resin, such as acryl resin, polyurethane resin or silicon resin. Diffusion particle patterns for scattering incident light may be provided on the surface and/or inside of the diffusion plate.

In an alternative embodiment, such as in a case of an edge type backlight unit, the optical plate 870 may be in the form of a light guide plate. The light guide plate guides the incident light supplied from a light source (not shown) provided at a side of the light guide plate to the liquid crystal panel 100. In order to prevent the loss of light, the optical plate 870 may include a transparent material. In one exemplary embodiment, the optical plate 870 may be formed of polymethyl methacrylate ("PMMA").

Referring to FIG. 1, in order to improve the brightness of the light emitted to the liquid crystal panel 100 or to enhance the appearance quality, the optical sheet 880 is disposed above the optical plate 870. The optical sheet 880 may include at least one of, or any combination including one of, a diffusion sheet (not shown), a prism sheet (not shown), and a protective sheet (not shown).

In exemplary embodiments, the diffusion sheet having a haze can address the problem associated with the appearance quality, such as, bright lines, dark lines, dark portions at corners, etc. The prism sheet may include prism patterns disposed on its surface and functions to collect the light emitted from the optical plate 870. The protective sheet may be disposed above the prism sheet and protects the prism sheet while reducing or effectively preventing the prism sheet from being closely adhered to the liquid crystal panel 100, thereby further enhancing the appearance quality.

In the case of a direct type backlight unit, such as shown in FIG. 1, the reflective sheet 220 is disposed below the light source 210. The reflective sheet 220 is installed at a bottom chassis 250 and reflects the light emitted downwardly from the light source 210 toward the liquid crystal panel 100, thereby increasing the brightness efficiency.

Alternatively, in a case of an edge type backlight unit, the reflective sheet 220 is disposed below the light guide plate. The reflective sheet 220 reflects light that leaks from the light guide plate towards the light guide plate again, thereby increasing the brightness efficiency.

The liquid crystal panel 100, the light source 210, the optical plate 870, the reflective sheet 220, and the optical sheet 880 are accommodated in a receiving area constituted by the bottom chassis 250, the lower frame 400, the upper frame 890, and a top chassis 900.

In exemplary embodiments, the bottom chassis 250 may have a rectangular parallelepiped shape, including an upper portion opened to a front of the display device, and is positioned at a lowermost end (e.g., at a rear) of the liquid crystal display, such as considering the liquid crystal panel 100 at a front, or display side, of the display device. The lower frame 400 may be window or frame-shaped, as including an open central portion, and is disposed above the bottom chassis 250. The light source 210 and the reflective sheet 220 are housed in a space enclosed by the bottom surface 251 of the bottom chassis 250 and the lower frame 400. The lower frame 400 may also be configured to reduce or effectively prevent foreign matter from being introduced into the light source 210.

The upper frame 890 may also be window or frame-shaped and include an open central portion, and covering edges of the optical sheet 880. The optical plate 870 and the optical sheet 880 are disposed between the lower frame 400 and the upper frame 890. In addition, the upper frame 890 may be configured so as to maintain the liquid crystal panel 100 and the optical sheet 880 at a constant gap.

The top chassis 900 may be window or frame-shaped and include an open central portion, and is disposed at a topmost end of the liquid crystal display, for example, at the front of the display device. The top chassis 900 receives the liquid crystal panel 100 and is combined with the bottom chassis 250 to reduce or effectively prevent deviation of the liquid crystal panel 100.

Figure 3:
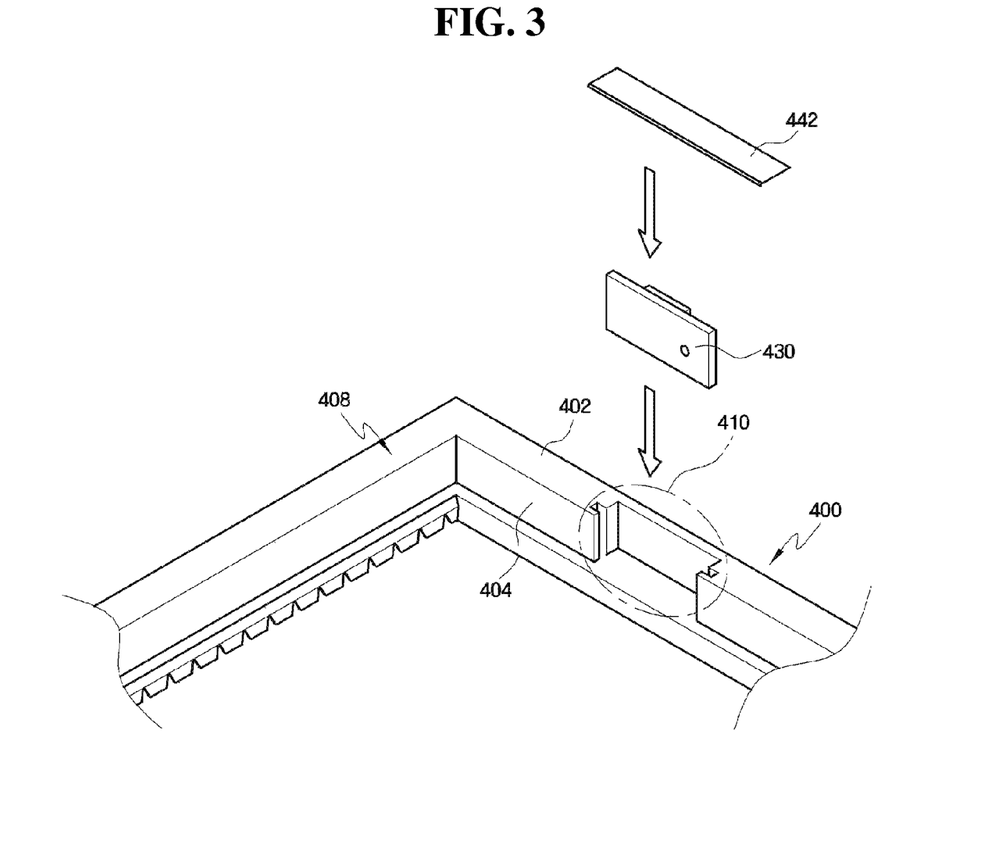
FIG. 3 is partial top plan view of an exemplary embodiment of a lower frame included in the liquid crystal display shown in FIG. 1.
Figure 4A:
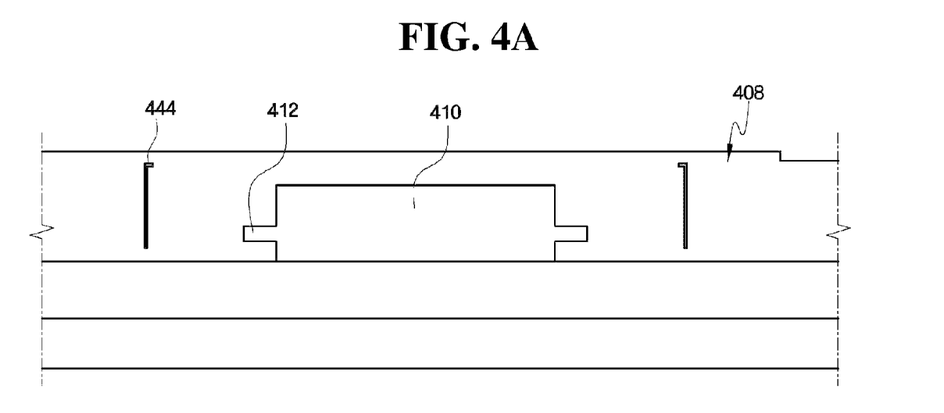
FIGS. 4A and 4B illustrate exemplary embodiments of a housing recess and a circuit board shown in FIG. 3.
Figure 4B:
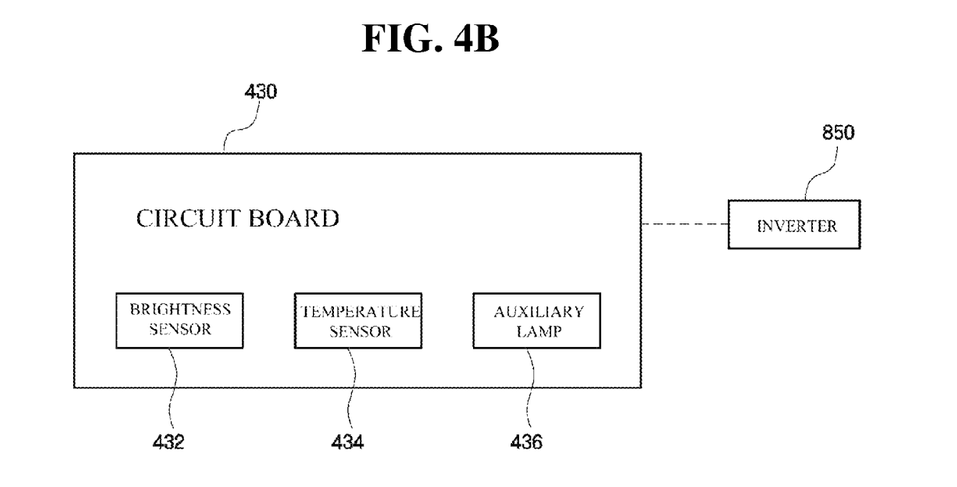
Figure 5:
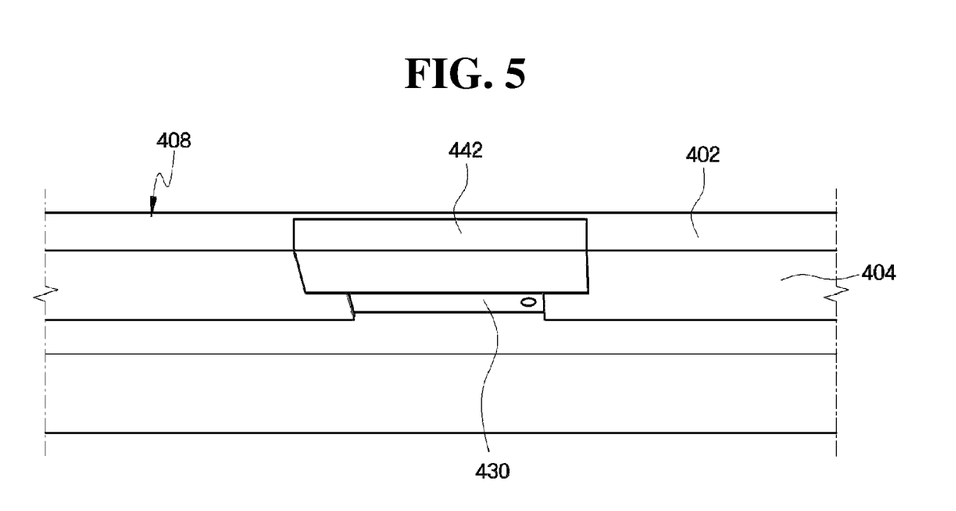
FIG. 5 is a diagram illustrating a state in which the circuit board is inserted into the housing recess in FIG. 3.

Hereinafter, an exemplary embodiment of the liquid crystal display according to the present invention will be described with reference to FIGS. 1, 2, 3, 4A, 4B and 5. FIG. 3 is partial top plan view of an exemplary embodiment of a lower frame included in the liquid crystal display shown in FIG. 1, FIGS. 4A and 4B illustrate a housing recess and a circuit board shown in FIG. 3, and FIG. 5 is a diagram illustrating a state in which the circuit board is inserted into the housing recess in FIG. 3. While the circuit board 430 is inserted into the lower frame 400 in the illustrated embodiment, it is understood that the circuit board 430 may also be inserted into the upper frame (see 890 of FIG. 1). One or more of the circuit board 430 may be disposed at one or more of the sidewalls 408 of the lower frame 400. In one exemplary embodiment, a circuit board 430 may be disposed in each sidewall 408 of the lower frame 400. Referring to FIGS. 3 and 5, the lower frame 400 of the liquid crystal display in the illustrated embodiment of the present invention includes a housing recess 410 into which the circuit board 430 is inserted downwardly from upper portions of the sidewalls 408, such as towards a rear of the liquid crystal display. In the sidewalls 408, each top surface 402 has an open area through which the housing recess 410 is accessible from or exposed to an outside of the frame. The circuit board 430 is inserted into the housing recess 410 through the open area disposed on the top surface 402 of one of the sidewalls 408, the open area exposing the housing recess 410 from a front side of the lower frame 400.

In the sidewalls 408, the inner surface 404 is interrupted at a position corresponding to the housing recess 410, such that the housing recess 410 is exposed from an inner side of the lower frame 400 (e.g., in a plan view of the inner surface 404). The inner surface 404 may also be considered as including an open area through which the housing recess 410 is accessible or exposed from the inner side.

As shown in FIG. 4A, insertion guiding slots 412 may be disposed at opposite sides of the housing recess 410, such as when viewed from the front side of the lower frame 400. Opposite edges of the circuit board 430 are inserted into the insertion guiding slots 412. In exemplary embodiments, a thickness of each of the insertion guiding slots 412 may be equal to or greater than a thickness of the circuit board 430. In a plan view of the top surface 402 of the lower frame 400 as illustrated in FIG. 4A, the insertion guiding slots 412 may face each other relative to the housing recess 410, and are extended from and connected to the housing recess 410.

When the opposite edges of the circuit board 430 are inserted into the insertion guiding slots 412, the opposite edges overlap with a portion of the sidewall 408 and a portion of the circuit board 430 disposed between the insertion guiding slots 412 is exposed in a plan view of the inner surface 404.

The circuit board 430 is inserted into the housing recess 410 and a blocking member 442, such as an adhesive (e.g. white) tape, may be disposed directly on and fixed to the top surface 402 of the sidewalls 408. The white tape 442 may function as a circuit board release preventing member, such as to maintain the circuit board 430 contained in the housing recess 410 and insertion guiding slots 412. In detail, even if the liquid crystal display is subjected to shock or vibration, the white tape 442 may reduce or effectively prevent the circuit board 430 from being separated from the lower frame 400.

In an alternative embodiment, a blocking member, such as the white tape 442, may cover the open or interrupted area of the inner surface 404 of the lower frame 400 where the housing recess 410 is exposed. The blocking member may contact the inner surface 404 at opposing edges of the housing recess 410, and be disposed to extend horizontally across the housing recess 410 to overlap with the inner surface 404. The blocking member may include separate elements being respectively disposed at the top surface 402 and the inner surface 404 of the lower frame. Alternatively, the blocking member may be a single continuous piece that spans the open area of the top surface 402 and the open area of the inner surface 404 corresponding to the housing recess 410.

In an exemplary embodiment, the white tape 442 may also function as a reflection member. Since light is not reflected properly from the open area of the housing recess 410 in the lower frame, dark portions may be disposed at the open area of the housing recess 410. Advantageously, since the reflection member covers the open area of the housing recess 410, formation of the dark portions at the open area of the housing recess 410 are reduced or effectively prevented. In particular, since the white tape 442 has excellent reflectivity compared to other color tapes, it can be effectively used in preventing dark portions from being formed.

As shown in FIG. 4A, a blocking member guide 444 may be disposed directly on the top surface 402 of the sidewalls 408. The 444 enables a worker to place the blocking member 442 thereto, thereby easily disposing the blocking member 442 to the top surface 402 of the sidewalls 408 of the lower frame 400.

Referring further to FIG. 4B, the circuit board 430 inserted into the housing recess 410 includes a brightness sensor 432, a temperature sensor 434, and/or an auxiliary lamp 436.

The brightness sensor 432 measures the brightness of light supplied from the light source 210 to the liquid crystal panel 100. The temperature sensor 434 measures the temperature of the backlight unit. The brightness of light measured by the brightness sensor 432 and/or the temperature measured by the temperature sensor 434 is transmitted to the inverter 850. The voltage supplied from the inverter 850 is adjusted depending on at least one of values measured by the brightness sensor 432 and the temperature sensor 434. The inverter 850 may be configured include a control element (not shown) to activate the adjustment of the voltage supplied from the inverter 850, or alternatively, an external control element (not shown) may effect the adjustment of the voltage.

In an exemplary embodiment, the inverter 850 can reduce a voltage supplied by the inverter and transferred to the light source 210 at greater than or equal to a predetermined level of brightness or temperature, such as when a predetermined threshold value is met or exceeded. Advantageously, since a voltage is reduced when the threshold value is determined as being met or exceeded, power consumption of the liquid crystal display may be reduced, and a reduction in the service life thereof can be reduced or effectively prevented by reducing the power consumption of the inverter 850 in such a manner.

In one exemplary embodiment, in a case of a DID (Digital Information Display) product, which is generally a 24-hour-time display product, the number of viewers will be markedly reduced during night hours. a voltage supplied from the inverter 850 to the light source 210 may be reduced during a predetermined time period or after a predetermined duration of time, which may reduce the power consumption of the DID product, ultimately preventing a reduction in the service life of the DID product.

In exemplary embodiments, the auxiliary lamp 436 may be a relatively small-sized light source, such as a light emitting diode ("LED"). As shown in FIG. 5, the blocking member 442 disposed on the housing recess 410 may be positioned such that a portion of the circuit board 430 is exposed outwardly. Thus, the light generated from the auxiliary lamp 436 may be exposed through the housing recess 410. With this structure, the auxiliary lamp 436 can facilitate a black start process.

Where the light source 210, such as CCFL, which has been in a dark state for a long time, is started up from the dark state, a predetermined time is required until the light source 210 is completely started up. That is to say, the predetermined time after applying a voltage to the light source 210 is required until current flows, which is called the black start process. The black start process may occur when the light source 210 is maintained in a dark state too long to be discharged, so that electrons in the light source 210 are completely eliminated.

If the auxiliary lamp 436 of the circuit board is driven to supply a light during the startup in a dark state, the discharge of the light source 210 can be facilitated, thereby facilitating the black start process.

In the illustrated embodiment shown in FIG. 5, a portion of the circuit board 430 is exposed through the housing recess 410 and the portion of the circuit board 430 is coated with a reflective material. The exposed portion of the circuit board 430 may include the brightness sensor 432, the temperature sensor 434 and/or the auxiliary lamp 436. The reflective material of the circuit board 430 may prevent formation of dark portions by preventing the light incident into the open area through the housing recess 410 from being effectively reflected.

When the circuit board 430 is inserted into the housing recess 410, the exposed portion of the circuit board 430 faces an inner area of the lower frame 400. On this exposed portion of the circuit board 430, the brightness sensor 432, the temperature sensor 434 and/or the auxiliary lamp 436 may be disposed. Referring to FIGS. 1, 3 and 4B, light emitted from the light source 210, or the light source 210 itself is disposed at the inner area of the lower frame 400 when the liquid crystal display is assembled.

Advantageously, since the brightness sensor 432, the temperature sensor 434 and/or the auxiliary lamp 436 on the exposed portion of the circuit board 430 faces the inner area of the lower frame 400, the brightness of light at an inside area of the backlight unit may be measured by the brightness sensor 432, the temperature of the backlight unit may be measured by the temperature sensor 434, and the discharge of the light source 210 can be facilitated when the auxiliary lamp 436 of the circuit board is driven to supply a light during the startup in a dark state. Furthermore, since the circuit board 430 including the brightness sensor 432, the temperature sensor 434 and/or the auxiliary lamp 436 is disposed between the inner surface 404 and the outer surface 406, the circuit board 430 does not extend into the inner area of the lower frame 400, such as to interfere with other elements or to increase an overall dimension of the liquid crystal display. The circuit board 430, the brightness sensor 432, the temperature sensor 434 and/or the auxiliary lamp 436 of the illustrated embodiment may be referred to as being disposed completely within the lower frame 400 or within the sidewall 408 of the lower frame 400, and disposed internal to the lower frame 400.

Figure 6:
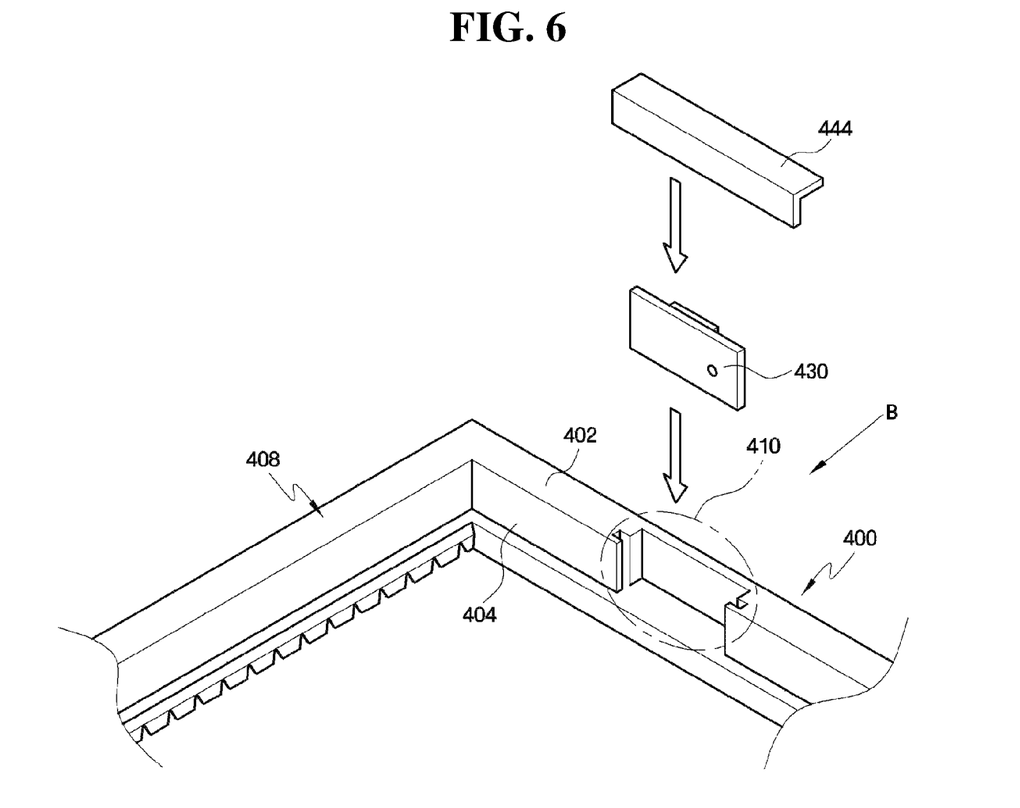
FIG. 6 is partial top plan view of another exemplary embodiment of a lower frame included in a liquid crystal display according to the present invention.
Figure 7:
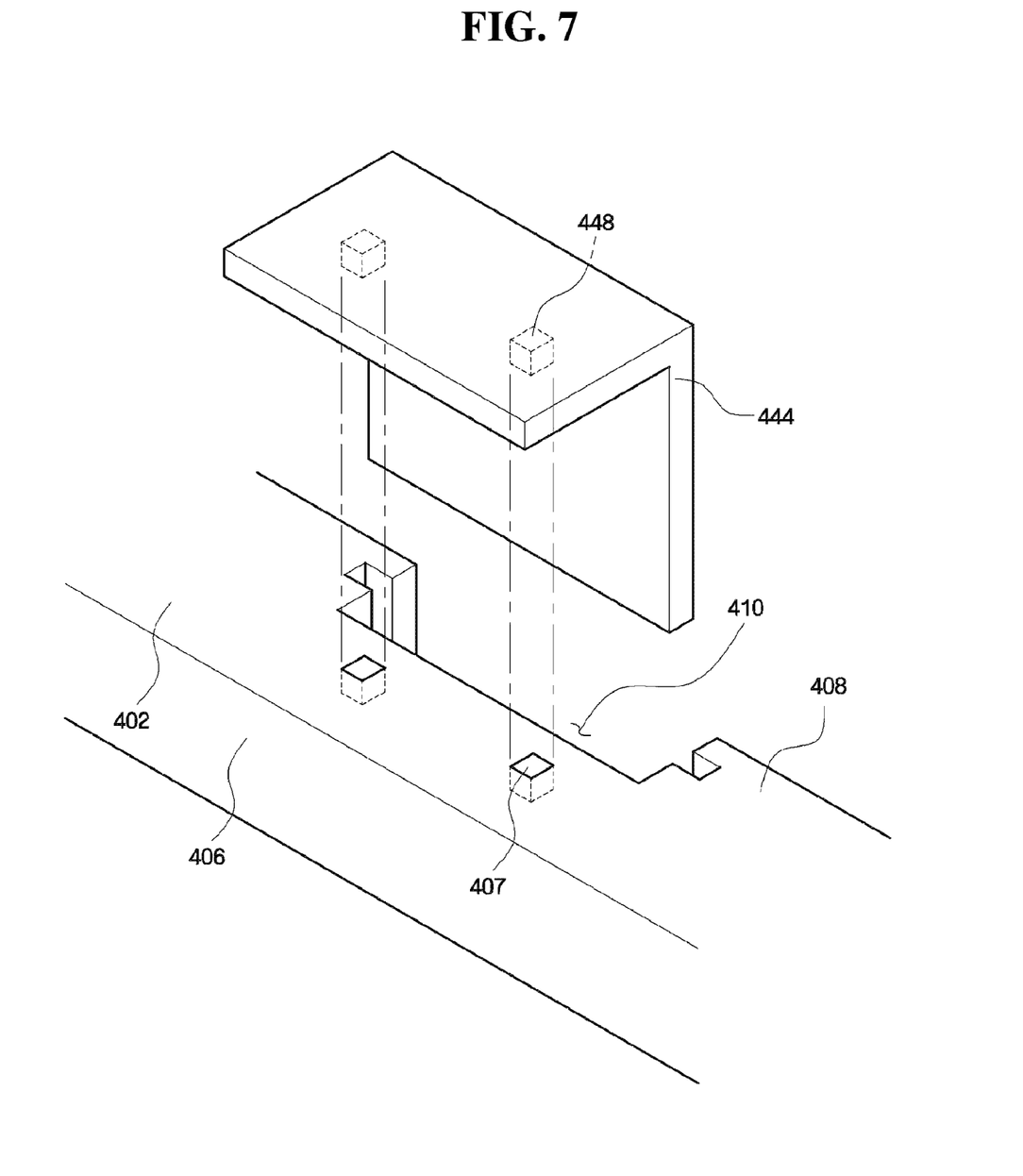
FIG. 7 is a diagram illustrating an exemplary embodiment of a reflective cover and sidewalls viewed from a portion B of FIG. 6.

Hereinafter, an exemplary embodiment of a liquid crystal display according to the present invention will be described with reference to FIGS. 1, 2, 6 and 7. FIG. 6 is partial top plan view of another exemplary embodiment of a lower frame included in a liquid crystal display according to the illustrated embodiment, and FIG. 7 is a view illustrating a reflective cover and sidewalls of portion B of FIG. 6. Components which have practically the same functions as those of the liquid crystal display according to the illustrated embodiment of the present invention described with reference to FIGS. 1, 2, 3, 4A, 4B and 5, are denoted by the same reference numerals as the corresponding components and description thereof will be omitted.

Referring to FIG. 6, the liquid crystal display further includes a reflective cover 444, compared to the liquid crystal display of the previous embodiment.

The reflective cover 444 may perform the same function as a white tape blocking member (see 442 of FIG. 3). That is to say, since the reflective cover 444 functions as a circuit board 430 release preventing member, even if the liquid crystal display is subjected to shock or vibration, the reflective cover 444 may prevent the circuit board 430 from being separated from the lower frame 400, such as in a vertical direction towards the front of the display device.

In addition, the reflective cover 444 may cover the open areas of the housing recess 410 formed by the interruption of the inner surface 404 and/or the top surface 402. The reflective cover 444 is disposed to overlap both a portion of the top surface 402 and the inner surface 404 of the lower frame 400, and may include two separate members or one single continuous member, as illustrated in FIG. 7. Since the reflective cover 444 includes reflective material and since it extends in planes of the adjacent top surface 402 and inner surface 404, the reflective cover 444 may also function as a reflection member.

Referring further to FIG. 7, the reflective cover 444 may include coupling elements 448 disposed on a surface of the reflective cover 444 facing the lower frame 400. The lower frame 400 may include coupling elements 407 configured for engagement with the coupling elements 448 of the reflective cover 444. In the illustrated embodiment, the coupling elements 407 of the lower frame 400 are disposed on the top surface 402 of the sidewalls 408 facing an inner surface of the reflective cover 444. The coupling elements 407 and 448 are configured to correspond to each other in profile, shape, size and/or location, such that the reflective cover 444 is fixed to the lower frame 400 solely by the coupling of the coupling elements 407 and 448 to each other. While FIG. 7 illustrates the coupling elements 407 and 448 being substantially rectilinear in shape, any of a number of shapes for the coupling elements 407 and 448 are within the scope of this invention. Additionally, while two of each of the coupling elements 407 and 448 are illustrated, any number of the coupling elements 407 and 448 are within the scope of this invention.

In an exemplary embodiment, the coupling elements 448 of the reflective cover 444 may be protrusions and/or grooves coupled to the top surface 402 of the sidewalls 408 of the lower frame 400. Alternatively, the coupling elements 407 and 448 may be shaped in forms of detachable hooks (not shown). The coupling elements 407 and 448 allow the reflective cover 444 to be easily attached to or detached from the sidewalls 408 of the lower frame 400. Advantageously, when it is necessary to disassemble the circuit board 430 from the lower frame 400 of the display device, such as due to a problem created at a brightness sensor or a temperature sensor, the reflective cover 444 can be easily and removably separated from the assembly.

Figure 8:
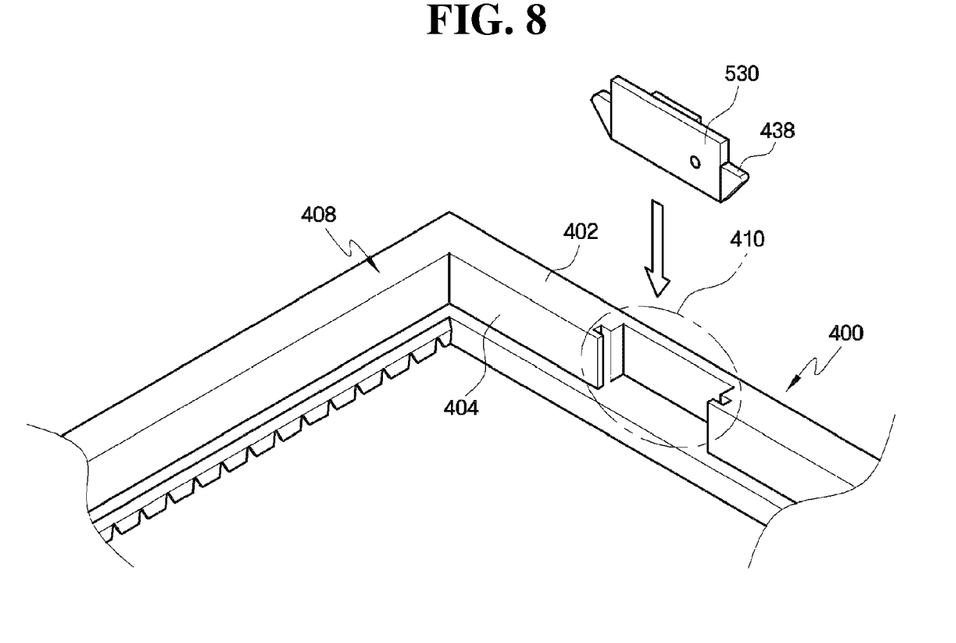
FIG. 8 is partial top plan view of another exemplary embodiment of a lower frame included in a liquid crystal display according to the present invention.

Hereinafter, a liquid crystal display according to an exemplary embodiment of the present invention will be described with reference to FIGS. 1, 2, and 8. FIG. 8 is partial top plan view of another exemplary embodiment of a lower frame included in a liquid crystal display according to the present invention. Components which have practically the same functions as those of the liquid crystal display according to the exemplary embodiment of the present invention described with reference to FIGS. 1, 2, 3, 4A, 4B and 5, are denoted by the same reference numerals as the corresponding components and description thereof will be omitted.

Referring to FIG. 8, stoppers 438 are installed at opposite sides of a circuit board 530 included in the liquid crystal display according to the illustrated embodiment. The circuit board 530 including the stoppers 438 is combined with a housing recess 410 of a lower frame 400 by a physical force, such as to engage an interference or frictional fit between the stoppers 438 and the insertion guiding slots 412. The insertion guiding slots 412 may also be referred to as a groove, and may extend completely through both the top surface 402 and a portion of the sidewall 408 of the lower frame 400. Alternatively, coupling holes (not shown) engaged with the stoppers 438 may be disposed in the housing recess 410. These coupling holes may be disposed at any position between the top surface 402 and a lower surface of the sidewall 408.

The stoppers 438 are extended from a main portion of the circuit board 530 at sides of the circuit board 530 corresponding to the insertion guiding slots 412. The stoppers 438 may be separately formed and connected with the main portion of the circuit board 530 (see FIG. 8), or alternatively, the main portion of the circuit board 530 and the stoppers 438 may be a single continuous member.

When the circuit board 530 including the stoppers 438 is fixed in the housing recess 410, such as inserted into the insertions guiding slots 412, the stoppers 438 overlap with the lower frame 400 and may not be visible in a plan view of the inner surface 404. The main portion of the circuit board 530 may be completely or wholly visible in a plan view of the inner surface 404 when the circuit board 530 is fixed in the housing recess 410 with only the stoppers 438 overlapped with portions of the lower frame 400.

As described above, since the stoppers 438 are used to fix the circuit board 530 to the housing recess 410, a separate member for securely fixing the circuit board 530 is not necessary. In other words, the circuit board 530, as including the stoppers 438, is solely secured in the lower frame 400 by the coupling of the stoppers 438 with the insertion guiding slots 412 of the lower frame 400.

In an exemplary embodiment, the circuit board 530 may also include a brightness sensor, a temperature sensor, and/or an auxiliary lamp, like the circuit board (see 430 of FIG. 4B).

Figure 9A:
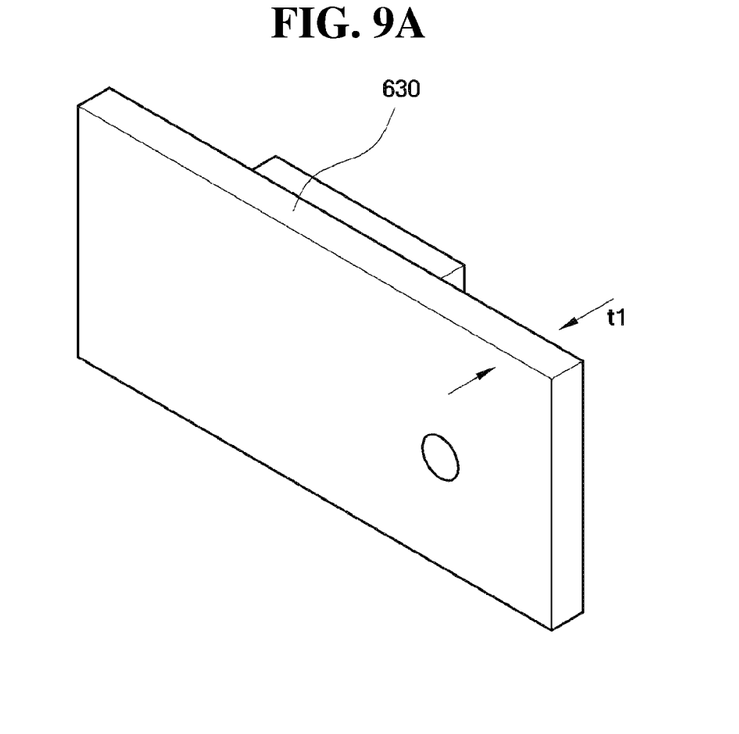
FIGS. 9A and 9B are partial views of another exemplary embodiment of a circuit board and a lower frame included in a liquid crystal display according to the present invention.
Figure 9B:
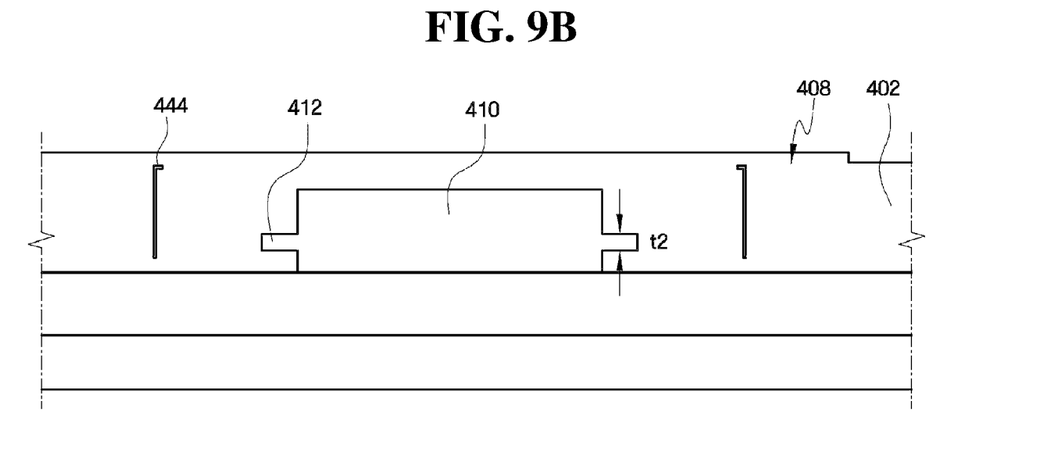

Hereinafter, a liquid crystal display according to an exemplary embodiment of the present invention will be described with reference to FIGS. 1, 2, and 9A and 9B. FIGS. 9A and 9B are partial views of other exemplary embodiments of a circuit board and a lower frame included in a liquid crystal display according to the present invention. Components which have practically the same functions as those of the liquid crystal display according to the exemplary embodiment of the present invention described with reference to FIGS. 1, 2, 3, 4A, 4B and 5, are denoted by the same reference numerals as the corresponding components and description thereof will be omitted.

Referring to FIGS. 9A and 9B, a thickness t1 of a circuit board 630 included in the liquid crystal display according to the present invention is smaller than a thickness t2 of the insertion guiding slot 412 disposed in the housing recess 410 of the lower frame 400.

In one exemplary embodiment, a thickness t1 of the circuit board 630 is 1 millimeter (mm), and a thickness t2 of the insertion guiding slot 412 is 0.8 mm. When the circuit board 630 is forcibly fitted into the insertion guiding slot 412, the circuit board 630 can be securely fixed in the housing recess 410 through an interference fit of the circuit board 630 and the insertion guiding slot 412, such that the circuit board 630 is coupled to the lower frame 400 only by the differences in thicknesses of the circuit board 630 and the insertion guiding slots 412. Accordingly, no further member for securely fixing the circuit board 630 to the lower frame 400 is separately required.

Figure 10:
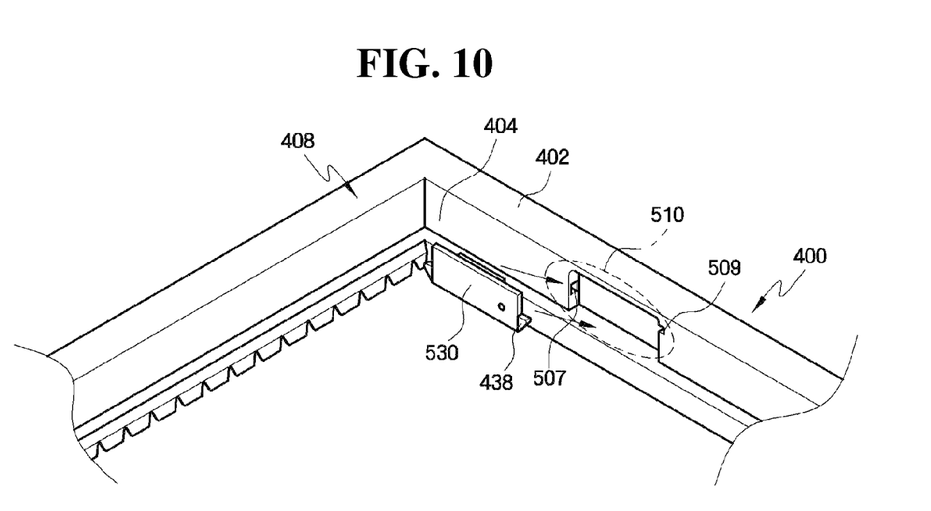
FIG. 10 is partial top plan view of another exemplary embodiment of a lower frame included in a liquid crystal display according to the present invention.
Figure 11:
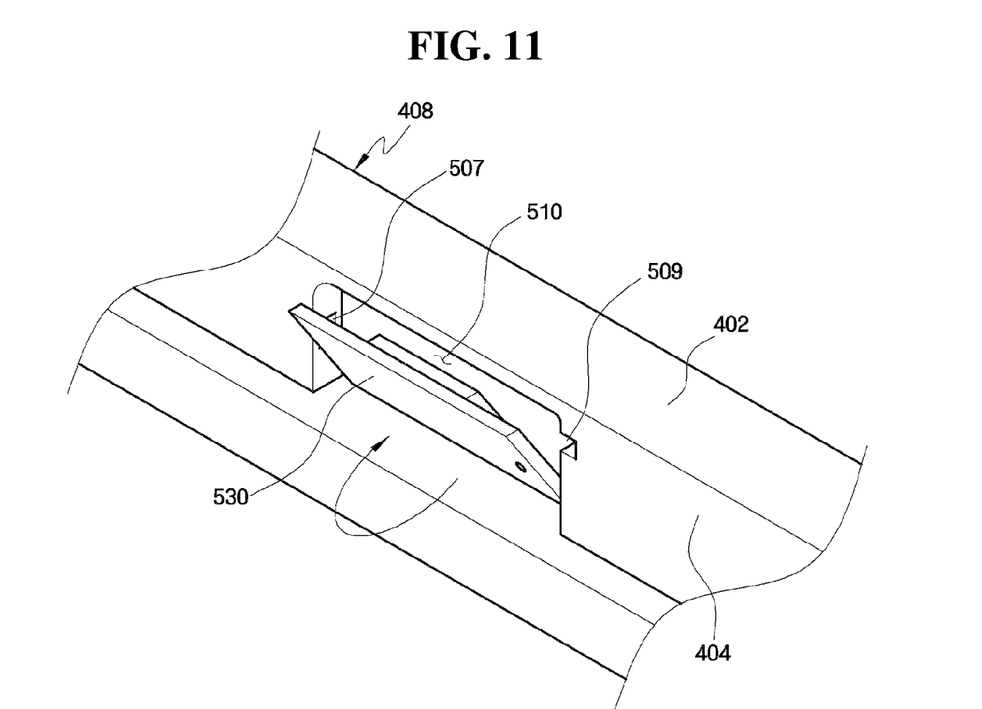
FIG. 11 is a diagram illustrating a state in which the circuit board is inserted into the housing recess in FIG. 10.
Figure 12:
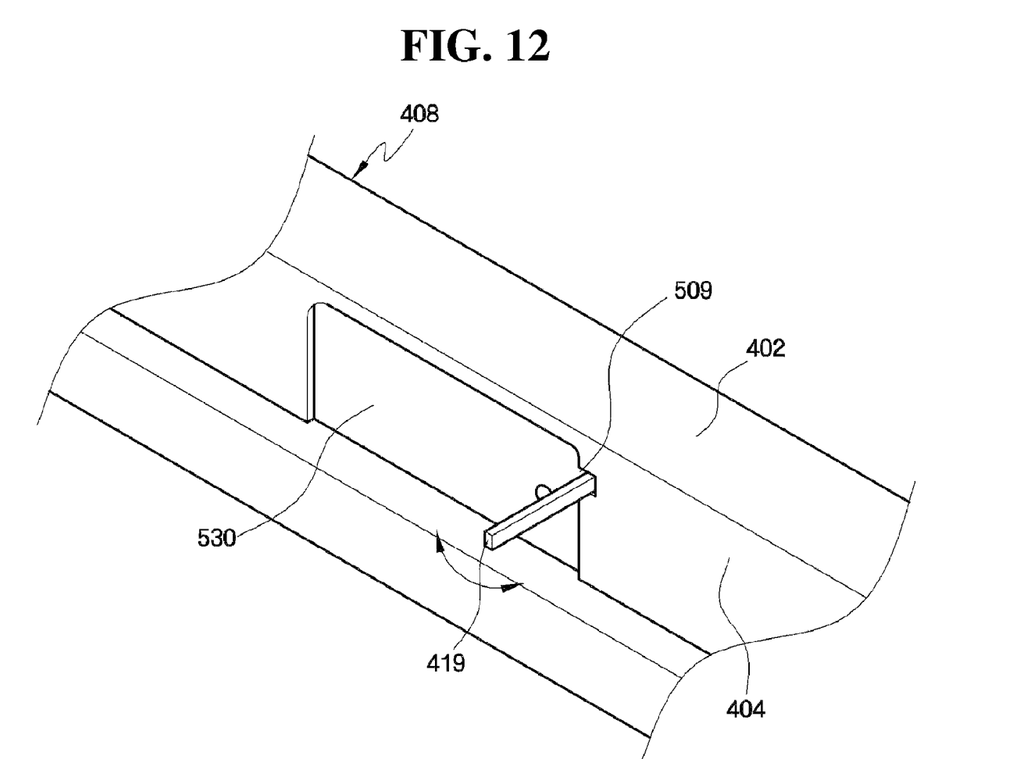
FIG. 12 is a diagram illustrating an exemplary embodiment of a state in which the circuit board is separated from the housing recess.

Hereinafter, the liquid crystal display according to an exemplary embodiment of the present invention will be described with reference to FIGS. 1, 2, 10, 11 and 12. FIG. 10 is partial top plan view of another exemplary embodiment of a lower frame included in a liquid crystal display according to the present invention, FIG. 11 is a diagram illustrating a state in which the circuit board is inserted into the housing recess in FIG. 10, and FIG. 12 is a diagram illustrating a state in which the circuit board is separated from the housing recess. Components which have practically the same functions as those of the liquid crystal display according to the exemplary embodiment of the present invention described with reference to FIGS. 1, 2, and 8, are denoted by the same reference numerals as the corresponding components and description thereof will be omitted.

Referring to FIGS. 10 through 12, a lower frame 400 included in a liquid crystal display according to an exemplary embodiment of the present invention has a housing recess 510 into which a circuit board 530 is inserted inwardly from sidewalls 408. In one of the sidewalls 408, an inner surface 404 includes an open area through which the housing recess 510 is exposed.

The circuit board 530 is inserted into the housing recess 510 through the open area disposed on the inner surface 404 of the sidewalls 408.

In the illustrated embodiment, the top surface 402 of the sidewalls 408 may not include an open area through which the housing recess 510 is opened. Advantageously, it is possible to reduce or effectively prevent formation of dark portions due to the open area in the inner surface 404 through which the housing recess 510 is exposed by not providing the open area on the top surface 402.

Stoppers 438 are installed at opposite sides of the circuit board 530. In the illustrated embodiment, the stoppers 438 have a substantially triangular shape with a length of the stoppers 438 (taken from the main portion of the circuit board 530) increasing from a bottom portion to a top portion of the circuit board 530. However, the shape and size of the stoppers 438 are not limited thereto.

A dimension of the open area in the inner surface 404, such as in a horizontal direction, may be smaller than a total length of the circuit board 530 between distal ends of the stoppers 438 taken in the horizontal direction. Since a longitudinal length of the circuit board 530 is larger than the open area.

The circuit board 530 including the stoppers 438 may be combined with the housing recess 510 of the lower frame 400 using a physical force, such as through an interference fit. Alternatively, coupling holes 507 configured to engage with the stoppers 438 of the circuit board 530 may be disposed at an internal surface of the housing recess 510.

In one exemplary embodiment, a first end of the circuit board 530 including one of the stoppers 438 may be initially inserted into a coupling hole 507 disposed in one or more inner surfaces of the housing recess 510. The circuit board 530 is then rotated as indicated by the arrow such that it pivots on the initially inserted first end, until the other one of the stoppers is inserted into another coupling hole 507. Finally, the circuit board 530 is securely fixed in the lower frame 400, as shown in FIG. 11 only by the coupling of the stoppers 438 to corresponding coupling holes 507.

As described above, since the circuit board 530 is fixed with the housing recess 510 using the stoppers 438, no other member for fixing the circuit board 530 is required.

Referring to FIG. 12, a release preventing groove 509 contacting the housing recess 510 may be disposed on the lower frame 400. The release preventing groove 509 may extend through the inner surface 404 and a portion of the sidewall 408, such as at least to a position where the circuit board 530 would be disposed. The release preventing groove 509 can be advantageously used, when there is a necessity of dissembling the circuit board 530 in order to solve a problem associated with a brightness sensor or a temperature sensor. As shown in FIG. 12, a releasing bar 419 is inserted into the release preventing groove 509, the releasing bar 419 is contacted with the circuit board 530 disposed in the housing recess 510, and a physical force is then applied to the circuit board 530 horizontally, essentially prying the circuit board 530 and thereby simply releasing the circuit board 530 from the lower frame 400 assembly.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A liquid crystal display comprising:
 a liquid crystal panel displaying images;
 a light source supplying light to the liquid crystal panel;
 a circuit board including at least one of a brightness sensor and a temperature sensor;
 a frame including a plurality of sidewalls each including an inner surface, an outer surface and a top surface, the frame further including a recess in a sidewall and into which the circuit board is inserted downwardly, and the top surface of the sidewall includes a first open area through which the recess is accessible from an outside of the frame; and
 a blocking member covering the first open area of the top surface of the sidewall where the recess is opened.

2. The liquid crystal display of claim 1, wherein the blocking member reflects the light supplied by the light source.

3. The liquid crystal display of claim 1, wherein the blocking member is an adhesive tape.

4. The liquid crystal display of claim 3, wherein a blocking member guide is disposed on the top surface of the sidewall and corresponds to a position of the tape.

5. The liquid crystal display of claim 1, wherein the blocking member includes a reflective cover removably attached to the frame, the reflecting cover including first coupling members disposed on an inner surface of the reflecting cover facing the frame, and
 the frame includes second coupling members facing the first coupling members such that the reflecting cover is attached to the frame when the first and second coupling members are combined.

6. The liquid crystal display of claim 5, wherein the first coupling members and the second coupling members include protrusions and/or grooves.

7. The liquid crystal display of claim 1, wherein the circuit board further includes stoppers installed at opposite sides of the circuit board, and
 the recess includes coupling holes disposed in a portion of the frame adjacent to the recess and engagable with the stoppers;
 wherein the circuit board is fixed in the recess solely by the engagement of the stoppers and the coupling holes.

8. The liquid crystal display of claim 1, wherein insertion guiding slots are disposed at opposite sides of the recess and receive ends of the circuit board, and
 a thickness of each of the insertion guiding slots is smaller than that of the circuit board,
 wherein the circuit board is fixed in the recess solely by the ends received in the insertion guiding slots.

9. The liquid crystal display of claim 1, wherein the circuit board further includes an auxiliary lamp is mounted on the circuit board, and
 the inner surface of the sidewall includes a second open area continuous with the first open area through which the recess is accessible from an inside of the frame,
 wherein when the circuit board is inserted into the frame, light generated from the auxiliary lamp is emitted from the recess.

10. The liquid crystal display of claim 1, wherein a portion of the circuit board is exposed through the recess when the circuit board is inserted into the frame, and the exposed portion of the circuit board is coated with a reflective material.

11. The liquid crystal display of claim 1, further comprising an inverter applying a voltage driving the light source, the voltage supplied from the inverter being adjusted depending on at least one of values measured by the brightness sensor and values measured by the temperature sensor.

12. A method of manufacturing a liquid crystal display, the method comprising:
 disposing an inner surface of a sidewall of a frame to face a light source emitting light;
 removably inserting a circuit board into a recess of the sidewall of the frame, the inserting a circuit board including exposing a first surface of the circuit board to emitted light from the light source, and the circuit board including at least one of a brightness sensor and a temperature sensor disposed on the first surface; and
 interfacing the circuit board to a power source, the power source supplying voltage to the light source and adjusting the voltage supplied in response to inputs from one of the brightness sensor and the temperature sensor.

* * * * *